(12) United States Patent
Kevan

(10) Patent No.: US 8,959,161 B2
(45) Date of Patent: Feb. 17, 2015

(54) METHOD AND APPARATUS FOR ELECTRONIC MESSAGING FOR MANAGING AND COMMUNICATING AVAILABILITY OF A USER

(75) Inventor: Sherrene D. Kevan, Cambridge (CA)

(73) Assignee: Enviroquest, Ltd., Cambridge, ON (CA)

( * ) Notice: Subject to any disclaimer, the term of this patent is extended or adjusted under 35 U.S.C. 154(b) by 113 days.

(21) Appl. No.: 13/008,584

(22) Filed: Jan. 18, 2011

(65) Prior Publication Data

US 2012/0023176 A1 Jan. 26, 2012

Related U.S. Application Data

(60) Provisional application No. 61/295,246, filed on Jan. 15, 2010.

(51) Int. Cl.
*G06F 15/16* (2006.01)
*G06Q 10/10* (2012.01)
*H04L 12/18* (2006.01)
*H04L 12/58* (2006.01)
*H04W 4/02* (2009.01)
*G06Q 50/20* (2012.01)
*H04L 29/08* (2006.01)

(52) U.S. Cl.
CPC .......... *G06Q 10/103* (2013.01); *H04L 12/1845* (2013.01); *H04L 12/5815* (2013.01); *H04L 51/043* (2013.01); *H04W 4/023* (2013.01); *G06Q 50/20* (2013.01); *H04L 67/18* (2013.01)
USPC .......... 709/206; 709/204; 709/225; 709/226; 434/350; 379/201.02; 379/219

(58) Field of Classification Search
CPC .. G06Q 10/103; G06Q 50/20; H04L 12/1845; H04L 12/5815; H04L 51/043; H04L 67/18; H04W 4/023
USPC .................. 709/204, 206, 225–226; 434/350; 379/201.02, 219
See application file for complete search history.

(56) References Cited

U.S. PATENT DOCUMENTS

| 6,714,222 B1 | 3/2004 | Bjorn et al. |
| 6,982,649 B2 * | 1/2006 | Blum et al. ................. 340/815.4 |
| 2002/0181684 A1 * | 12/2002 | Logan ....................... 379/201.02 |
| 2003/0014296 A1 | 1/2003 | Meine |

(Continued)

FOREIGN PATENT DOCUMENTS

WO WO 2006090326 A1 * 8/2006

OTHER PUBLICATIONS

Canadian Office Action pertaining to Canadian Patent Appln. No. 2,728,718, dated Jul. 4, 2011.

(Continued)

*Primary Examiner* — Hitesh Patel
(74) *Attorney, Agent, or Firm* — Dinsmore & Shohl LLP

(57) ABSTRACT

A method, apparatus and systems for managing and communicating the availability of a first user to a community using an electronic message board connected to a wall or door. The electronic message board may display messages to the community. The first user and the community may leave recorded audio and/or video messages for each other on the electronic message board through a user interface and the location of the first user may be determined by the electronic message board and displayed to the community.

19 Claims, 2 Drawing Sheets

(56) References Cited

U.S. PATENT DOCUMENTS

| | | |
|---|---|---|
| 2005/0032525 A1 | 2/2005 | Gasbarro |
| 2006/0032491 A1 | 2/2006 | Olson et al. |
| 2006/0154642 A1 | 7/2006 | Scannell, Jr. |
| 2006/0198350 A1 | 9/2006 | Kim |
| 2007/0070891 A1 | 3/2007 | Zheng |
| 2008/0030427 A1* | 2/2008 | Lanham .................. 345/2.3 |
| 2008/0212413 A1 | 9/2008 | Pikula et al. |
| 2009/0011834 A1 | 1/2009 | Chhabra |
| 2009/0083062 A1* | 3/2009 | Gupta ............................... 705/1 |
| 2009/0113311 A1 | 4/2009 | Fried |
| 2009/0313185 A1* | 12/2009 | Johnson, Jr. .................. 705/500 |
| 2010/0122183 A1 | 5/2010 | Babaian et al. |

OTHER PUBLICATIONS

Canadian Office Action dated Dec. 5, 2011 in reference to co-pending Canadian Pat. Appln. No. 2,728,718 filed Jan. 1, 2011.

Notice of Allowance, Oct. 15, 2013, pertaining to related Canadian Patent Application No. 2,728,718 filed Jan. 17, 2011.

* cited by examiner

METHOD AND APPARATUS FOR ELECTRONIC MESSAGING FOR MANAGING AND COMMUNICATING AVAILABILITY OF A USER

CROSS REFERENCE TO RELATED APPLICATIONS

The present application claims the benefit of U.S. Provisional No. 61/295,246, filed Jan. 15, 2010 and a Canadian patent application, filed Jan. 17, 2011 (application no. pending).

BACKGROUND

The present application relates to an electronic message board. The present application further relates to an electronic message board system and a method for managing and communicating the availability of a user.

Often times, students would like to locate a professor, teacher or instructor outside of a scheduled class in order to ask questions, get help on a homework assignment, or address other matters. Students may attempt to find the instructor at their office, but the instructor may not be present for a number of reasons. Therefore, it would be desirable for a student to be able to locate a professor, leave a message, find out the assignment, reading or research project, and to discover other notifications that may be pertinent to the student's class.

SUMMARY

The present application relates to a method of managing availability of a first user utilizing an electronic message board within a community. The method may include using the electronic message board at a first location, transmitting a position data signal of the first user to the electronic message board, enabling a plurality of secondary users to view the current location of the first user on the electronic message board; and communicating to at least one of the plurality of secondary users information related to the community.

The present application also relates to an electronic message board for managing and communicating the availability of a first user. The electronic message board may include a hardware component further including a processing module, a storage module, and a communications module; a display panel connected to the hardware component for displaying information regarding the first user to at least one of a plurality of secondary users, the display panel adapted to be connected to a first surface; a graphical interface enabling users to receive information from and provide information to the hardware component; a plurality of ports having the ability to upload and download data or information; a recording component having the ability to record an electronic message; a transceiver for receiving from and transmitting positioning data to a mobile device of the first user; and global positioning software for determining and providing a current location of the first user based upon the positioning data received from the mobile device; wherein the display panel, upon a command by one of the plurality of secondary users, displays the current location of the first user.

The present application also relates to an electronic message board system. The electronic message board system may include an electronic message board further including a hardware component including a processing module, a storage module, and a communications module, a display panel connected to the hardware component for displaying information regarding the first user to at least one of a plurality of secondary users, the display panel adapted to be connected to a first surface, a graphical interface enabling users to receive information from and provide information to the hardware component, a plurality of ports having the ability to upload and download data or information; a recording component having the ability to record an electronic message, a transceiver for receiving from and transmitting positioning data to a mobile device of the first user, and global positioning software for determining and providing a current location of the first user based upon the positioning data received from the mobile device; and a mobile device including a transceiver for transmitting positioning data to the electronic message board; wherein the display panel, upon a command by one of the plurality of secondary users, displays the current location of the first user.

BRIEF DESCRIPTION OF THE DRAWINGS

The present disclosure will become more fully understood from the following detailed description, taken in conjunction with the accompanying figures, wherein like reference numerals refer to like elements, in which.

DETAILED DESCRIPTION

Before turning to the figures, which illustrate several embodiments in detail, it should be understood that the application is not limited to the details or methodology set forth in the description or illustrated in the figures. It should also be understood that the terminology is for the purpose of description only and should not be regarded as limiting.

Figure 1:
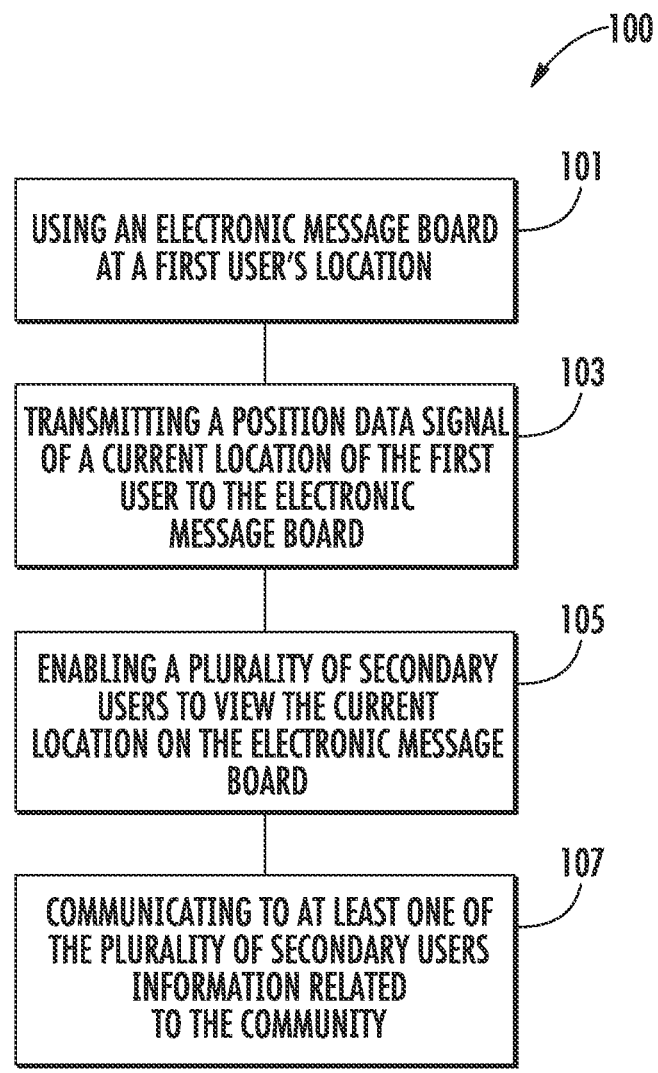
FIG. 1 is a flowchart of a method for managing availability according to the present disclosure.

FIG. 1 is a flowchart of a method for managing availability according to the present disclosure. The method 100 of managing availability of a first user utilizing the electronic message board 10 within a community includes using an electronic message board 10 at a first location (101); transmitting a position data signal of a current location of the first user to the electronic message board 10 (103); enabling a plurality of secondary users to view the current location of the first user on the electronic message board 10 (105); and communicating to at least one of the plurality of secondary users information related to the community (107).

The method further includes using the electronic message board 10 at a first location (101), where the first location may include an office, laboratory, or any location that can be accessible. The first user may be a professor, student, teacher, teaching assistant, counselor, or other members that may be part of a defined community and have been granted access to the electronic message board 10. The plurality of secondary users may be students, teachers, professors, teaching assistants, counselors, or other members that may be part of the defined community and be granted access to the electronic message board. In other illustrative embodiments, the community could include employees of an entity, a group of students in a dormitory or other residential housing, a group of medical professionals, and other variations. Any one of the members of these groups could be the first user and the remainder of the members of these groups would be the secondary users. For example, a first user may include a doctor and a plurality of secondary users may include interns, residents, nurses, other doctors, administrators, patients, and any other individuals that may be part of the defined community and may have been granted access to the electronic message board.

Referring further to FIG. 1, transmitting a position data signal of a current location of a first user to the electronic message board 10 (103) may include transmitting a global positioning signal from a mobile device 97 (shown in FIG. 2) such as, for example, a mobile computing device. The mobile device may be a radio frequency identification device, cell phone, smart phone, personal digital assistant ("PDA"), notepad, laptop, or any other device that is known in the art that has computing capabilities. Method 100 may also include recording a message using the electronic message board 10. The message may be recorded, using the electronic message board 10, by one of the plurality of secondary users. Furthermore, the electronic message board 10 may include security such as, for example, conventional security software, that limits the access to the recorded message. For example, the electronic message board 10 may be programmed to permit messages recorded by the plurality of secondary users to only be accessible by the first user. In other examples, the electronic message board 10 may be programmed to permit the secondary user recording the message to decide who has access to the message such as, for example, enabling not only the first user, but other secondary users to have access to the message. In another embodiment, the message may be recorded, using the electronic message board 10, by the first user. This message, using the security, may be accessible by only the plurality of secondary users or limited to only a subset of the plurality of secondary users (e.g., one user, two users, ten users, etc.). The message recorded may include an audio message, video message, or both.

Enabling the plurality of secondary users to view the current location of the first user on the electronic message board 10 (105) may include displaying the current location of the first user on a display panel 25 of the electronic message board 10. Information related to the community may include, but not be limited to, availability, schedules, calendar, assignments, location information (global positioning information), and emergency contact information. In another embodiment, the information may be tailored for instructors and students, which may include names of particular professors, particular classes, professor schedules, office hours, homework assignments, messages, student questions and professor location information such as, for example, current location. In other embodiments, the content of the messages will be pertinent to the community of users. For example, in a medical community, the pertinent information may be patient history, prescription information, course of treatment and other information related to the medical community.

Figure 2:
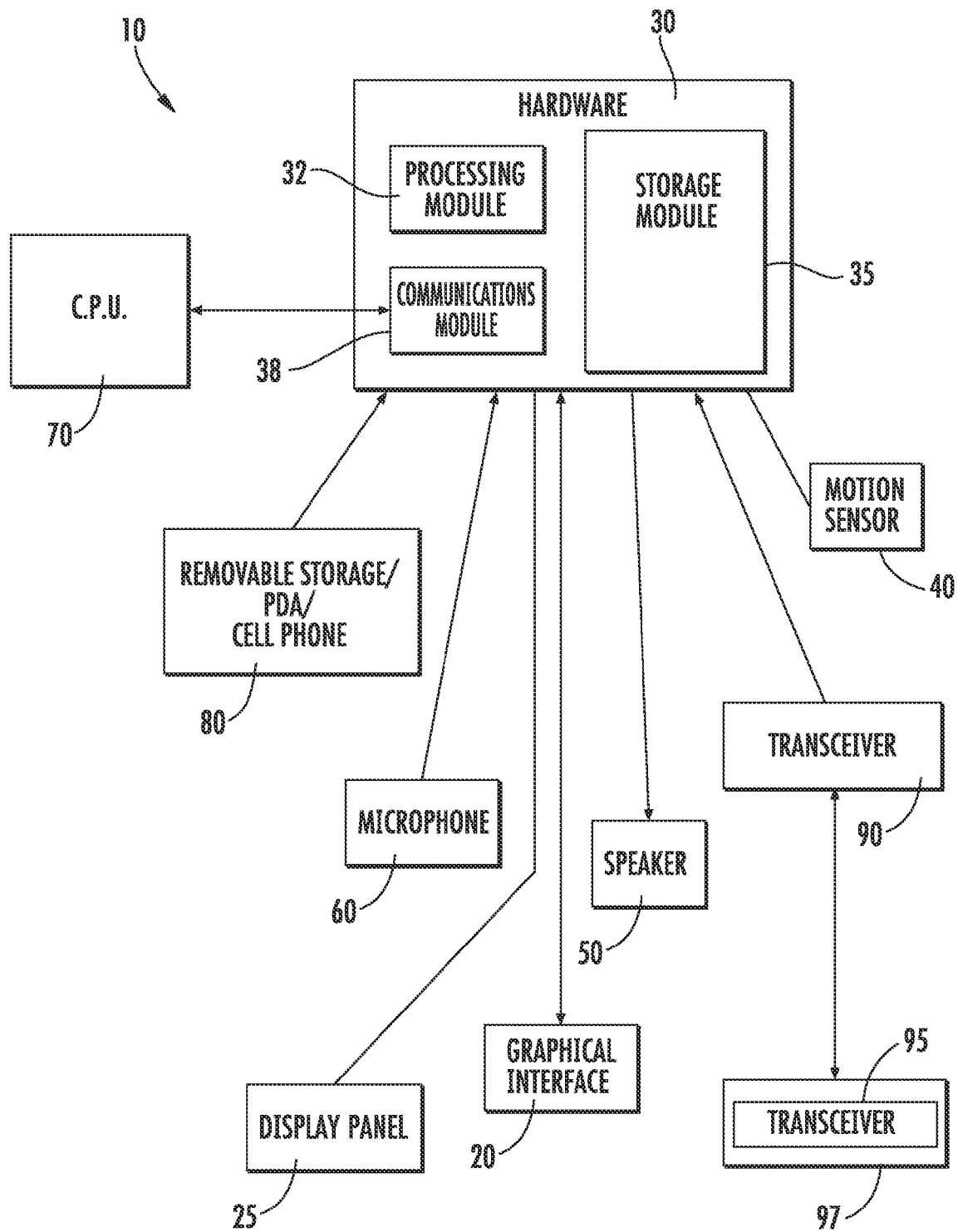
FIG. 2 is a block diagram of an electronic message board, according to the present disclosure.

FIG. 2 is a block diagram of an electronic message board and its system, according to the present disclosure. The electronic message board 10 for managing and communicating the availability of a first user includes a hardware component 30 that includes a processing module 32, a storage module 35, and a communications module 38; a display panel 25 connected to the hardware component 30 for displaying information regarding the first user to at least one of a plurality of secondary users, the display panel 25 adapted to be connected to a first surface. The hardware component 30 may comprise a computer, a microcontroller, a display driver, and/or the like. The hardware component 30 is not restricted by particular style or variety, as may comprise any hardware that supports the inventive operations described herein, and may include a processing module 32, a storage module 35 (may further include RAM and/or a hard drive) and a communications module 38. The hardware component 30 may standalone or may be in further communication with at least one other central processing unit 70. The first surface may include a door or wall. In one embodiment, the electronic message board 10 may be attached to a professor's office door or a wall near the professor's office that is accessible to students. The electronic message board 10 may be directly attached to the door or wall, or may be secured through the employment of a frame. The frame may be attached directly to the door or wall and open up for the insertion of the electronic message board 10 and close to secure the electronic message board 10. In other embodiments, the frame may further lock for security purposes. In an embodiment where the door or wall is an exterior door or wall, and therefore exposed to the elements, at least a portion of the electronic message board 10 may include an exterior environment protective housing.

Referring to FIG. 2, the electronic message board 10 also includes a graphical interface 20 enabling users to receive, display on the display panel 25, and input information into the hardware component 30. The graphical interface 20 may include an LCD, plasma, LED, OLED, or any other material that can be used within a display. The graphical interface 20 may further include a touch screen (direct touch or in cooperation with a touch screen pen) for ease of application, or may further include a keyboard and mouse. The graphical interface 20 may be employed to record, upload, edit, display, send and receive messages (text and audio) and/or data files, display schedules and calendars and provide location information for particular users. In some embodiments, the graphical interface 20 may provide a user with a variety of data headings, such as, for example, schedules, messages, emergency contact information, assignments, location information, etc. When a user selects a particular data heading, the user may be presented with a variety of subheadings. For example, in certain embodiments, the data heading for schedules may incorporate subheadings that include the names of particular users and calendars with an appropriate listing of events for those particular users. For embodiments of the electronic message board 10 that are tailored for applications with professors and students, the headings and/or subheadings may include the names of particular professors, particular classes, professor schedules, office hours, homework assignments, messages, student questions and professor location information.

In other embodiments, the graphical interface 20 may provide general access to only a portion of the data headings and/or subheadings. Access to additional data headings and/or subheadings would depend upon a user providing identifying information (e.g., a user name and/or password determined or assigned during a registration process) to the graphical interface 20. For embodiments of the electronic message board 10 that are tailored for applications with professors and students, the general student population may have access to view a professor's schedule and homework assignments, but a student may be required to provide their user name and/or password to upload a message to the professor or homework assignment to the electronic message board 10. Further, once messages and/or homework assignments have been uploaded by students, only the professor (through providing the required identifying information) may have access to such messages and/or homework assignments.

Accordingly, users may create text messages for either display to the public or for viewing by selected other users. In embodiments that incorporate a touch screen graphical interface 20, the user may write the message with a touch screen pen or may type the message employing a graphical representation of a conventional computer/typewriter keyboard on the graphical interface 20. The text message may then be linked to the schedule of another user, e.g., an appointment request, may be linked generally to another user or may be generally posted. For text messages linked to the schedule of another user or generally linked to another user, the user may then have a choice of saving the message as either a private or public file. Private files may be viewed by only particular users that have access to such files through the providing the required identifying information. In some embodiments, the text message may be time-stamped.

Users may also create audio messages for public dissemination or for private listening by selected other users. In embodiments that incorporate a touch screen graphical interface 20, the user may be presented with a graphical representation of the buttons of a tape recorder (record, stop, play, pause, etc.) on the graphical interface 20. The audio message may be linked to the schedule of another user, e.g., an appointment request, may be linked generally to another user or may be generally posted. A user may record the message and have a choice of saving the message as either a private or public file. Again, private files may be heard by only particular users that have access to such files through the providing the required identifying information. In some embodiments, the audio message may be time-stamped.

Referring again to FIG. 2, the electronic message board also includes a plurality of ports having the ability to upload and download data or information via removable storage or a mobile device 80. The mobile device 80 may include a PDA, mobile phone, a computer, removable storage or combinations of these devices. The electronic message board 10 may include at least one port for the connection of removable storage devices and drives, PDA's and cell phones 80. The port(s) may be located anywhere on the electronic message board 10, including the front, sides, bottom and/or top, and may comprise, for example, a USB port or a memory card port. In addition, electronic devices, including PDA's, cell phones and other computers 70,80, may be capable of wireless communication with the electronic message board 10, through Bluetooth® technology or otherwise.

The electronic message board also includes a recording component 50,60 having the ability to record an electronic message. The recording component may include a microphone 60 and a speaker 50 for the recording and playing of audio messages. The microphone 60 and the speaker 50 may be connected to the hardware component 30, or incorporated into the graphical interface 20, and may be located anywhere on the electronic message board 10, including the front, sides, bottom and/or top.

The electronic message board 10 also includes a transceiver 90 for receiving from and transmitting data to the mobile device 97. The electronic message board 10 may include, in place of the transceiver 90, other transceivers that are capable of transmitting and/or receiving data from other devices (e.g., mobile or fixed computing devices), including, but not limited to positioning data from devices such as GPS devices, radio frequency identification devices, infrared devices, or other devices. The transceiver 90 may both receive and transmit GPS signals from a remote device. The electronic message board 10 includes global positioning software for determining and providing a location of a mobile device; where the processing module 32 causes the transceiver 90 to receive positioning data from a mobile device of the first user, the global positioning software to determine the location of the first user from the received location data, and the display panel 25, upon a command, to display the location of the first user. In some embodiments, the global positioning software may cooperate with a mobile device 97 equipped with a transceiver 95, and provide the location of the user(s) that is carrying the mobile device 97. Alternatively, the mobile device 97 may include other transceivers for transmitting and receiving data other than positioning data, including, but not limited to, GPS, infrared, and radio frequency identification for transmitting positioning data to the electronic message board 10. In such embodiments, the location of the particular user(s) may be graphically represented on a chart or map image that is displayed and updated on the graphical interface 20 of the electronic message board 10. Therefore, a user at the electronic message board 10 may track the location and movement of the user carrying the transceiver 95 (or the device incorporating the transceiver). Accordingly, if the user carrying the transceiver 95 is close by, the user at the electronic message board 10 can wait or travel to the user carrying the transceiver 95, but if the user carrying the transceiver 95 is far away, the user at the electronic message board 10 can leave a message or return at a later time. In another embodiment, the transceiver 90,95 may determine the location of a mobile device based on previous GPS coordinates and time of day.

In another embodiment, the electronic message board may include a power source. In certain embodiments, the electronic message board 10 may include at least one solar cell to collect light energy for powering the device. In other embodiments, power may be provided by at least one battery or by direct current electricity provided by a wall outlet. As shown in FIG. 2, a motion sensor 40 may be included on the electronic message board 10 to activate power to the overall device and/or particular programs when a movement is detected in front of the graphical interface 20. Accordingly, the motion sensor 40 may provide a power saving feature.

The electronic message board 10 may also include additional computer software and/or operating system known in the art that is employed in office computing systems and cooperates with the graphical interface 20 and hardware component 30. However, any computer software and/or operating system may be employed in the operation of the electronic message board 10.

While the present disclosure has been particularly shown and described with reference to specific embodiments, it should be understood by those skilled in the art that various changes in form and detail may be made therein without departing from the spirit and scope of the disclosure as defined by the appended claims.

What is claimed is:

1. An electronic message board associated with a first user for managing the communication between the first user and a plurality of secondary users, the electronic message board comprising:
   a hardware component comprising a processing module, a storage module, and a communications module;
   a plurality of ports coupled to the hardware component and chosen from the group comprising a USB port and a memory card port, the plurality of ports are configured to upload and download a data or information to and from a removable storage device;
   a recording component configured to record an electronic message, wherein the electronic message is an audio message or a video message;
   a speaker coupled to the hardware component and used to play an audio of the electronic message;
   a mobile device configured to receive a location data and transmit a positioning data signal of a current location of the first user using the location data, the mobile device is carried by the first user;
   a transceiver for receiving from the mobile device the positioning data signal relating to the current location of the first user;

a display panel connected to the hardware component and configured to display the data or information, display a video of the electronic message, and display the current location of the first user on a map image;

a graphical interface configured to enable the first user and the plurality of secondary users to receive information from and provide information to the hardware component and enable the first user to play the electronic message recorded by the one of the plurality of secondary users or enable one of the plurality of secondary users at the office associated with the first user to play the electronic message recorded by the first user;

a motion sensor configured to activate power to the electronic message board when a movement is detected in front of the display panel at the first location;

at least one solar cell to collect light energy for powering the electronic message board; and wherein the electronic message board is connected to a first surface at a first location associated with the first user.

2. The electronic message board of claim 1, wherein the graphical interface further comprises a touch screen.

3. The electronic message board of claim 1, further comprising a global positioning software for determining and providing the current location of the first user based upon the positioning data received from the mobile device.

4. The electronic message board of claim 1, wherein the data or information is selected from the group comprising a homework assignment, an emergency contact information, a schedule, a name of a particular first user, a first user's schedule, a first user's office hours, one of a plurality of secondary user's questions, and a message for the first user from one of the plurality of secondary users.

5. The electronic message board of claim 1, wherein the first location is an office or a laboratory.

6. The electronic message board of claim 5, wherein the first user is selected from the group comprising a professor, a teacher, a teaching assistant, and a counselor.

7. The electronic message board of claim 6, wherein the plurality of secondary users is a plurality of students.

8. The electronic message board of claim 5, wherein the first user is a doctor.

9. The electronic message board of claim 8, wherein the plurality of secondary users is selected from the group comprising interns, residents, nurses, administrators, and patients.

10. The electronic message board of claim 1, wherein the electronic message board further comprises security software to limit an first user access to the electronic message.

11. Electronic message board of claim 10, wherein the electronic message board further comprises programming to permit the electronic message recorded by the plurality of secondary users to only be accessible by the first user.

12. A method of managing the communication between the first user and a plurality of secondary users utilizing an electronic message board located at an office of the first user, the method comprising:

enabling either a first user or at least one of a plurality of secondary users to record an electronic message on an electronic message board at an office, wherein the electronic message board is connected to a door or wall at the office and the electronic message board comprises:

a hardware component comprising a processing module, a storage module, and a communications module, a plurality of ports coupled to the hardware component and chosen from the group comprising a USB port and a memory card port, the plurality of ports are configured to upload and download a data or information to and from a removable storage device, a recording component configured to record an electronic message, wherein the electronic message is an audio message or a video message, a speaker coupled to the hardware component and used to play an audio of the electronic message, a display panel connected to the hardware component for displaying the data or information and displaying a video of the electronic message, a graphical interface configured to enable the first user and the plurality of secondary users to receive information from and provide information to the hardware component, a transceiver for receiving from a mobile device a positioning data signal relating to a current location of the first user, a motion sensor configured to activate power to the electronic message board when a movement is detected in front of the display panel, and at least one solar cell to collect light energy for powering the electronic message board;

enabling either the first user or the plurality of secondary users to upload the data or information to the electronic message board at the office using the plurality of ports;

enabling either the first user or the plurality of secondary users to download the data or information from the electronic message board at the office using the plurality of ports;

enabling the first user at the office to play the electronic message recorded by the one of the plurality of secondary users;

enabling one of the plurality of secondary users at the office to play the electronic message recorded by the first user;

instructing the first user to carry the mobile device;

instructing that the mobile device receive a location data;

transmitting to the electronic message board from the mobile device the positioning data signal of the current location of the first user using the location data; and enabling the plurality of secondary users to view the current location of the first user on a map image on the electronic message board.

13. The method of claim 12, wherein the location data is received from a GPS device, a radio frequency identification device, or an infrared device.

14. The method of claim 12, wherein the electronic message board further comprises a global positioning software for determining and providing the current location of the first user based upon the positioning data received from the mobile device.

15. The method of claim 12, wherein the data or information is selected from the group comprising a homework assignment, emergency contact information, schedules, a name of particular first user, a first user's schedule, a first user's office hours, one of a plurality of secondary user's questions, and a message for the first user from one of the plurality of secondary users.

16. The method of claim 12, wherein the electronic message board further comprises a motion sensor configured to activate power to the electronic message board when a movement is detected in front of the display panel at the first location of the first user.

17. The method of claim 12, wherein the electronic message board further comprises security software to limit an access to the electronic message.

18. The method of claim 12, wherein the electronic message board further comprises programming to permit the electronic message recorded by the plurality of secondary users to only be accessible by the first user.

19. A method for utilizing an electronic message board located at an office of a professor, the method comprising:

enabling either a professor or at least one of a plurality of students to record an the electronic message on an electronic message board at an office associated with the professor wherein the electronic message board is connected to a wall or door at the office associated with the professor, and the electronic message board comprises:

a hardware component comprising a processing module, a storage module, and a communications module, a plurality of ports coupled to the hardware component and chosen from the group comprising a USB port and a memory card port, the plurality of ports are configured to upload and download a data or information to and from a removable storage device, a recording component configured to record an electronic message, wherein the electronic message is an audio message or a video message, a speaker coupled to the hardware component and used to play an audio of the electronic message, a transceiver for receiving from a mobile device, positioning data signal relating to a current location of the professor, a display panel connected to the hardware component for displaying the data or information, displaying a video of the electronic message, and displaying the current location of the professor on a map image, a graphical interface configured to enable the first user and the plurality of secondary users to receive information from and provide information to the hardware component, a motion sensor configured to activate power to the electronic message board when a movement is detected in front of the display panel, and at least one solar cell to collect light energy for powering the electronic message board;

instructing the professor to carry a mobile device;

instructing that the mobile device receive a location data;

transmitting to the electronic message board from the mobile device a positioning data signal of the current location of the professor using the location data;

enabling a plurality of students to view the current location of the professor on a map image on the electronic message board;

enabling either the professor or the plurality of students to upload the data or information to the electronic message board at the office of the professor using the plurality of ports;

enabling either the professor or the plurality of students to download the data or information from the electronic message board at the office of the professor using the plurality of ports;

enabling the professor at the office associated with the professor to play the electronic message recorded by the one of the plurality of students; and enabling one of the plurality of students at the office associated with the professor to play the electronic message recorded by the professor.

* * * * *